3,349,139
PREPARATION OF CIS-DECALIN
Fred Jaffe, Cincinnati, Ohio, assignor to W. R. Grace & Co., New York, N.Y., a corporation of Connecticut
No Drawing. Filed June 9, 1965, Ser. No. 462,726
2 Claims. (Cl. 260—667)

ABSTRACT OF THE DISCLOSURE

A method for preparing cis-Decalin which comprises contacting Tetralin with hydrogen at relatively low pressures in the presence of a catalytic amount of rhodium.

---

The present invention relates to the preparation of Decalin. More specifically, the invention relates to a novel method by which Tetralin may be hydrogenated to obtain Decalin which consists primarily of the cis isomer.

It is generally known that Decalin (decahydronaphthalene) may be oxidized to obtain the useful hydroperoxide derivative. It is also known that the cis isomer of Decalin may be oxidized at a much more rapid rate than the trans isomer or mixtures of cis and trans isomers. Hence, when Decalin is prepared by the hydrogenation of an unsaturated homolog such as Tetralin (1,2,3,4-tetrahydronaphthalene) for use in the preparation of hydroperoxide, it is preferred that a hydrogenated product be obtained that consists primarily of the cis isomer.

The prior art discloses a variety of high pressure catalytic hydrogenation processes which will produce Decalin that is relatively rich in the cis isomer. However, these high pressure processes are frequently relatively expensive and difficult to conduct. To date a convenient low pressure process for hydrogenating Tetralin to primarily cis Decalin has not been developed.

It is therefore an object of the present invention to provide an improved method for preparing cis Decalin.

It is another object to provide a convenient and inexpensive means by which Tetralin may be hydrogenated to obtain Decalin which consists primarily of the cis isomer.

These and still further objects of the present invention will become readily apparent to one skilled in the art and the following detailed description and specific examples.

In general, the present invention involves a method for preparing cis Decalin which comprises contacting Tetralin with hydrogen at relatively low pressures in the presence of a catalytic amount of rhodium. The rhodium is preferably maintained on an inert support. Furthermore the reaction is best carried out in the presence of a solvent.

More specifically I have found that if Tetralin is contacted with hydrogen under pressures from about 0.1 to about 100 atmospheres in the presence of a rhodium catalyst, and preferably a solvent, hydrogenation of the Tetralin to Decalin will proceed in a manner which in many cases will yield over 90% cis Decalin in a relatively short time. This 90% yield of cis isomer is accompanied by a substantially 100% conversion of Tetralin to Decalin.

Preferably the solvent used in the practice of the present invention is a lower saturated carboxylic acid such as acetic acid. However other acids such as propionic, and mineral acids and non-acid solvents such as alcohol, amides, amines, esters, ethers, hydrocarbons and water may be used in the practice of the present invention. The amount of solvent used will generally be that amount which renders the reaction mixture easy to handle in the particular apparatus used. Thus, for example the reaction mixtures comprising from about 0.2 parts per weight to about 20 parts per weight solvent per part by weight of Tetralin being hydrogenated may be conveniently used. Furthermore in some instances it may be desirable to completely eliminate the solvent.

The rhodium catalyst is preferably deposited on an inert support such as alumina or carbon. When acetic acid is used as the solvent particularly high yields of cis isomer are obtained when an alumina is used as the support material for the catalyst.

The rhodium catalyst used in the present invention is generally known to those skilled in the art as a hydrogenation catalyst and is preferably prepared by reduction of rhodium salts such as the chloride or oxide.

The rate at which the present hydrogenation process proceeds is partially dependent on the amount of rhodium catalyst present. Hence, the amount of catalyst used to practice the present invention will depend on both practical and economic factors. Generally speaking I have found that satisfactory reaction rates are obtained when from about 0.40 to about 4.0 grams of rhodium is used per mole of Tetralin being hydrogenated. The precise ratio of rhodium to Tetralin used in any particular system however will obviously be affected by the manner in which the rhodium is placed on the inert support as well as the specific configuration of the support and the apparatus used to conduct the hydrogenation. Frequently it is found that a catalyst comprising about 5% rhodium on an insert support such as alumina or carbon is entirely satisfactory. When using such a preferred catalyst it is found that from about 12 to about 25 grams of catalyst per mole of Tetralin will provide quite satisfactory results.

It is generally found that the present hydrogenation process may be successfully carried out at temperatures as low as about 5° C. However temperatures ranging up to about 90° C. will produce a more rapid reaction rate. A preferred temperature range at which the reaction will proceed in a smooth reasonably rapid manner is room temperature, i.e. from about 20 to about 25° C.

As indicated previously the primary advantage of the present process over those disclosed in the prior art is that it may be carried out under low pressures. It is found that effective reaction rates may be obtained using pressures of hydrogen as low as about 0.5 atmosphere. Furthermore it is found that little advantage is obtained if the reaction pressure is raised to greater than about 100 atmospheres.

Under the general reaction conditions and catalyst concentrations specified above it is found that substantially complete conversion of Tetralin to Decalin may be readily obtained in as little as about 1–2 hours. This complete conversion to Decalin is accompanied by a yield of cis isomer which frequently exceeds 90%.

Subsequent to completion of the hydrogenation reaction which is determined when the Tetralin has absorbed the theoretical amount of hydrogen, the desired cis Decalin may be isolated from any trans isomer contained in the reaction mixture by a conventional fractional distillation procedure. By exercising reasonable care during the distillation, the use of a simple packed column will result in a cis Decalin which is chromatographically pure.

Having described the basic elements of the present invention, the following specific examples are given to illustrate embodiments thereof.

Example I

A Parr low pressure hydrogenation apparatus was charged with 5.0 g. of 5% rhodium on alumina, 26.4 g. Tetralin, and 250 ml. of glacial acetic acid. An average hydrogen pressure of 35 p.s.i. was maintained in the apparatus for 3½ hours whereupon the theoretical amount of hydrogen required to convert Tetralin to Decalin (0.61 mole) was absorbed. No further absorption of hydrogen could be observed during an additional ½ hour of treatment. The catalyst was removed by filtration and the reaction mixture was diluted with 300 ml. of water. The organic layer which separated upon dilution with water was taken up in petroleum ether and washed with sodium bicarbonate-water solution. After drying the mixture over anhydrous magnesium sulfate, the petroleum ether was evaporated and the residue analyzed by gas chromatography. The analysis indicated that no Tetralin remained in the reaction mixture and the Decalin obtained comprised 91% cis isomer and only 9% trans isomer.

*Example II*

The Parr apparatus used in Example I was charged with 26.4 g. of Tetralin, 250 ml. of glacial acetic acid and 5.5 g. of 2% rhodium on a silica-alumina support. Hydrogen pressure was maintained at about 35 p.s.i. for about 3 hours after which it was found the Tetralin was substantially converted to Decalin. Distillation of the reaction mixture subsequent to the work up set forth in Example I indicated that 80% of the Decalin obtained was cis isomer.

*Example III*

For comparison the example set forth in Example II was run using 0.17 g. of platinum oxide catalyst (Adams catalyst), 250 ml. of acetic acid was used as a solvent, and hydrogen was maintained over the reaction mixture at a pressure of about 35 p.s.i. Subsequent to an 18 hours reaction time, it was found that the conversion of Tetralin to Decalin was not yet complete.

*Example IV*

The previously used Parr apparatus was charged with 26.4 g. of Tetralin, 250 ml. of glacial acetic acid, and 2.5 g. of 5% rhodium on alumina support. Hydrogen was maintained at a pressure of 35 p.s.i. for about 3 hours. At the end of this time it was found that all the Tetralin had been converted to Decalin and that the Decalin consisted of 90% cis isomer.

*Example V*

A Parr apparatus was loaded with 26.4 g. of Tetralin, 250 ml. of methyl alcohol, and 2.5 g. of 5% rhodium on alumina catalyst. The reaction mixture was subjected to 35 p.s.i. hydrogen pressure for about 5½ hours at 23° C. After such time analysis indicated all the Tetralin had been converted to Decalin, and the Decalin contained 83% of the cis isomer.

*Example VI*

A Parr apparatus was loaded with 26.4 g. of Tetralin, 250 ml. of glacial acetic acid, and 2.5 g. of 5% rhodium on carbon support. The reaction mixture was subjected to hydrogen at 35 p.s.i. for a period of 5 hours at 24° C. After such time it was found all the Tetralin was converted to Decalin and the Decalin comprised 86% of the cis isomer.

*Example VII*

A Parr apparatus was loaded with 26.4 g. of Tetralin 25 ml. of acetic acid and 2.5 g. of 5% rhodium on alumina catalyst. Hydrogen was admitted at a pressure of 35 lbs. per square inch and maintained thereat for about 6 hours at 25° C. During the course of the reaction two liquid phases appeared which indicated Decalin as it was formed separated from the reaction mixture. The mixture was worked up as set forth in Example I. The Decalin obtained contained 90% cis isomer and no Tetralin.

The above specific examples clearly indicate that substantial yields of cis Decalin may be obtained in a short time using relatively mild reaction conditions when a rhodium catalyst is used.

I claim:

1. A method for preparing cis decahydronaphthalene which comprises contacting hydrogen under a pressure of from about 0.5 to about 10 atmospheres with a reaction mixture comprising 1,2,3,4-tetrahydronaphthalene, from about 50 to about 600 g. of acetic acid per mole of said 1,2,3,4-tetrahydronaphthalene in the presence of a catalyst consisting essentially of about 0.4 to about 4.0 g. rhodium per mole of said 1,2,3,4-tetrahydronaphthalene, said rhodium being maintained on an alumina support, the reaction mixture being held at from about 5° to about 90° C.; maintaining said hydrogen pressure until hydrogen to decahydronaphthalene is substantially complete; and separating cis decahydronaphthalene from trans decahydronaphthalene by fractional distillation.

2. A method for preparing cis decahydronaphthalene comprising reacting, at a pressure of about 0.1 to about 100 atmospheres and a temperature of about 5° to about 90° C., hydrogen and 1,2,3,4-tetrahydronaphthalene in the presence of a catalyst consisting essentially of rhodium on a support selected from the group consisting of carbon and alumina and recovering the cis decahydronaphthalene.

References Cited

UNITED STATES PATENTS

| | | | |
|---|---|---|---|
| 2,675,390 | 4/1954 | Rosenblatt | 260—667 |
| 3,000,983 | 9/1961 | Sanford et al. | 260—667 |
| 3,183,278 | 5/1965 | Koch | 260—667 |
| 3,227,768 | 1/1966 | Cole et al. | 260—667 |

SAMUEL P. JONES, *Primary Examiner.*

DELBERT E. GANTZ, *Examiner.*